United States Patent Office 2,938,863

Patented May 31, 1960

2,938,863

REMOVAL OF DISSOLVED OXYGEN FROM PETROLEUM FRACTIONS WITH SOLID SULFITES

Junior W. Loveland, Swarthmore, Pa., and Lawrence J. Cali, Claymont, Del., assignors to Sun Oil Company, Philadelphia, Pa., a corporation of New Jersey No Drawing. Filed Feb. 25, 1958, Ser. No. 717,338

4 Claims. (Cl. 208—283)

This invention relates to a new process for the removal of dissolved oxygen from petroleum fractions, and is especially applicable to petroleum fractions which are to be subjected to additional refinery processes.

Dissolved oxygen in petroleum fractions causes the formation of gums in various reactors and pipe lines in refinery processes, with consequent clogging and loss of efficiency of apparatus. In addition, the presence of free oxygen results in the formation of peroxides and hydroperoxides which cause discoloration of petroleum products. In refinery operations dissolved oxygen is kept to a minimum by storing petroleum fractions in tanks blanketed by inert gases, such as nitrogen. In the past it has often been the practice to purge petroleum fractions containing dissolved oxygen with nitrogen or another oxygen-free gas, but such a process is costly, and does not remove a substantial portion of the oxygen except by slow and lengthy purging. The use of hydrogen or carbon monoxide to react with the free oxygen is also an undesirable method because of the necessity for a catalyst. In addition, in some instances, such as in the preparation of olefins for polymerization by catalysts such as the titanium halides and aluminum trialkyls, the presence of water or compounds containing oxygen is highly objectionable, since these materials poison the catalyst.

It is an object of this invention to provide a process whereby dissolved oxygen may be removed from petroleum fractions. Other objects and their achievement in accordance with this invention will become apparent hereinafter.

In accordance with the process of this invention, a petroleum fraction containing dissolved oxygen is contacted with an alkali metal, alkaline earth metal or ammonium sulfite, whereby dissolved oxygen is removed from the petroleum fraction.

In a preferred embodiment of the invention, the liquid petroleum fraction is passed through a column of crystalline particles of hydrated sodium sulfite ($Na_2SO_3 \cdot 7H_2O$). Sodium sulfite is the preferred agent due to its high activity and low cost, and the hydrated salt is preferred because it is more active than the anhydrous salt. Surprisingly, the solid hydrated salt is also more active than a solution of the salt. The anhydrous material and aqueous or alcoholic solutions are also effective in removing oxygen from petroleum fractions, however, and may be preferred for some applications.

The sulfites and hydrated sulfites of other alkali metals and alkaline earth metals are also effective to varying degrees in removing dissolved oxygen from petroleum fractions. For example, potassium sulfite, lithium sulfite, calcium sulfite, barium sulfite, and magnesium sulfite, and hydrates and aqueous solutions of these materials, give good results. Ammonium sulfite also gives good results.

The petroleum fraction may be passed through the sulfite salt column one or more times, additional oxygen being removed in each pass. Another method which gives good results is to form a slurry of the sulfite salt in the petroleum fraction, agitate the slurry, and filter. Still another method which is used is to agitate the petroleum fraction with an aqueous or alcoholic solution of the sulfite salt, allow the solution and petroleum fraction to separate into two phases and decant. All of these operations are preferably performed in an inert atmosphere, such as nitrogen. Temperatures and pressures used can be varied widely although generally higher rates of removal of oxygen are obtained at higher temperatures, for example up to about 250° C. It is necessary, however, that the temperature and pressure conditions be such that the petroleum fraction is maintained in liquid phase. It is also necessary, when using the hydrated salts of this invention, that temperatures be low enough to prevent driving off water of hydration. Normally temperatures below about 100° C. are used at atmospheric pressure, although higher temperatures are conveniently used under higher pressures.

The following examples illustrate the process of this invention:

*Example 1*

Naphtha obtained by petroleum fractionating was determined by polarographic methods to contain 8 milligrams of oxygen per liter. About 200 milliliters of the naphtha were passed through a column of hydrated sodium sulfite 24 inches long and ½ inch in diameter at a rate of about 5 ml. per minute. All materials were at room temperature and under a nitrogen atmosphere of about 5 p.s.i.g. (pounds per square inch gauge). After one pass the naphtha was determined to contain 1 mg. per liter of dissolved oxygen.

*Example 2*

About 200 ml. of naphtha containing 38 mg. per liter of dissolved oxygen were passed through a column of anhydrous sodium sulfite under the same conditions as described in Example 1. After one pass the naphtha was determined to contain 27 mg. per liter of dissolved oxygen. The naphtha was recycled and again passed through the sodium sulfite column, whereupon the oxygen content was reduced to 21 mg. per liter. A third pass reduced the oxygen content to 18 mg. per liter.

*Example 3*

About 80 grams of naphtha containing 6 mg. per liter of dissolved oxygen was agitated with 30 grams of solid particles of hydrated sodium sulfite, in a closed container under a nitrogen atmosphere and at room temperature. After 10 minutes of agitation, the oxygen content was reduced to 3.5 mg. per liter, after 20 minutes it was reduced to 2.3 mg. per liter, and after 30 minutes only 1.1 mg. of dissolved oxygen per liter of naphtha remained. The sodium sulfite was separated by filtering.

*Example 4*

About 125 grams of naphtha containing 6 mg. per liter of dissolved oxygen were agitated with 50 ml. of a 10% aqueous solution of sodium sulfite in a closed container under a nitrogen atmosphere at room temperature. After 10 minutes agitation the dissolved oxygen was reduced to 4.3 mg. per liter, after 20 minutes it was reduced to 3.8 mg. per liter, and after 30 minutes 3.0 mg. per liter remained.

The invention claimed is:

1. A process which comprises contacting a liquid petroleum fraction containing dissolved oxygen with a solid salt selected from the group consisting of alkali metal sulfites and ammonium sulfite, whereby oxygen is removed from the liquid petroleum fraction.

2. A process which comprises contacting a liquid petroleum fraction containing dissolved oxygen with a solid hydrated salt selected from the group consisting of alkali metal sulfites and ammonium sulfite, whereby oxygen is removed from the liquid petroleum fraction.

3. A process as defined by claim 2 wherein the salt selected is hydrated sodium sulfite.

4. A process which comprises passing a liquid petroleum fraction having dissolved oxygen over a solid salt selected from the group consisting of the alkali metal sulfites and ammonium sulfite, whereby oxygen is removed from the liquid petroleum fraction.

References Cited in the file of this patent

UNITED STATES PATENTS

| | | |
|---|---|---|
| 1,562,156 | Faber et al. | Nov. 17, 1925 |
| 2,028,998 | Schulze et al. | Jan. 28, 1936 |
| 2,278,498 | Shoemaker | Apr. 7, 1942 |
| 2,473,195 | Cohen | June 14, 1949 |